United States Patent Office 3,567,697
Patented Mar. 2, 1971

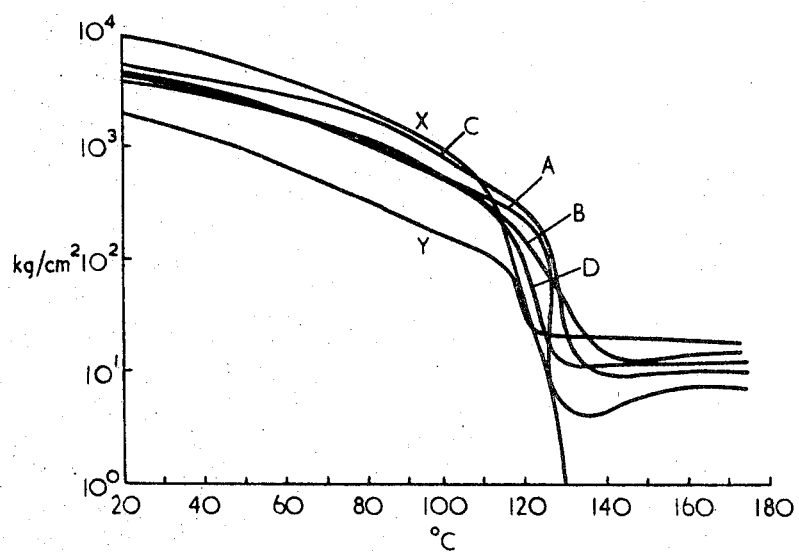

3,567,697
METHOD OF PRODUCING ARTICLES OF CROSS-LINKED POLYETHYLENE
Robert Frederick Bates and Harry Brody, Runcorn, England, assignors to Imperial Chemical Industries Limited, London, England
Filed Jan. 10, 1969, Ser. No. 790,285
Claims priority, application Great Britain, Jan. 23, 1968, 3,555/68
Int. Cl. C08f 1/60, 1/86, 27/00
U.S. Cl. 260—78.4
15 Claims

ABSTRACT OF THE DISCLOSURE

A method of preparation of a shaped article of a cross-linked polyolefine, and in particular of crystalline polyethylene, which comprises melt-shaping a composition comprising
(i) 100 parts of a crystalline polyolefine having a crystalline melting point $T_m$,
(ii) 0.25 to 10 parts of a thermally activatable free-radical generator having a half-life ($t\frac{1}{2}$) longer than 20 minutes at $T_m$ plus 10° C. and
(iii) preferably from 1 to 20 parts of a polymerisable nonconjugated polyene,
under conditions at which not more than 60% of the free-radical generator is dissociated while the composition is at a temperature above $T_m$ and therefore heating the shaped composition at a temperature below $T_m$ at which the free-radical generator is dissociated and cross-linking occurs.

---

The present invention relates to a method of obtaining shaped articles of cross-linked polyolefins.

The cross-linking of polymeric materials by mixing them with a free-radical generator and heating the compositions, usually after shaping, to cause dissociation of the free-radical generator is well-known. In the case of crystalline polymers, e.g. crystalline polyolefins, however, it has been usual to choose free-radical generators which are inactive during the shaping process and thus the shaped compositions have generally been heated above the crystalline melting point of the polymer in order to introduce the necessary cross-linking. As a result, some or all of the crystallinity has been destroyed and the product has suffered consequent reductions in, for example, heat distortion temperature and crystalline melting point. In particular a marked drop in shear modulus is usually observed at temperatures up to about the crystalline melting point of the polymer and this is undesirable where the products are intended for use in hot environments, e.g. as hot water pipe.

Shaped articles of crystalline polymeric material may also be cross-linked at temperatures below the crystalline melting point, by use of irradiation. However, irradiation is generally only suitable for use on thin sections, for example, sheets, films and fibres. Moreover, the use of irradiation, especially in the dosages necessary to achieve a useful degree of cross-linking may itself result in the destruction of polymer crystallinity with consequent deterioration in properties already described, notwithstanding that the cross-linking may be effected below the crystalline melting point.

We have now discovered a method of producing cross-linked shaped articles of crystalline polymer in which a substantial and controllable amount of the crystallinity of the polymeric material may be retained. The products of the process do not show the reduction in heat distortion temperature and crystalline melting point of products cross-linked at a temperature above the crystalline melting point. In fact, in some cases, the heat distortion temperature and crystalline melting point may be greater than the corresponding values for the unmodified polymer and some form stability may even be retained at temperatures up to 60° C. above the crystalline melting point. In particular, however, the above mentioned reduction in shear modulus may be substantially reduced by our cross-linking method.

According to the present invention the method comprises melt-shaping a composition comprising:
(i) 100 parts by weight of crystalline polyolefin having a crystalline melting point $T_m$,
(ii) From 0.25 to 10 parts by weight of a thermally activatable free-radical generator having a half-life ($t\frac{1}{2}$) of longer than 20 minutes at $T_m$ plus 10° C. and, preferably
(iii) From 1 to 20 parts by weight of a polymerisable non-conjugated polyene under conditions at which not more than 60% of the free-radical generator is dissociated while the composition is at a temperature above $T_m$ and thereafter causing or allowing the shaped composition to cool below $T_m$ and exposing it to a temperature which is above room temperature but below $T_m$ and at which thermal dissociation of the free-radical generator will occur, thereby effecting cross-linking.

By $T_m$ we mean the crystalline melting point as indicated by the temperature at which the peak is found on the graph obtained by plotting $\Delta T°$ against $T°$ C. for a sample of the polymer, using a Du Pont thermal analyser and a heating rate of 20° C./minute.

By melt-shaping we mean the process of shaping the composition, e.g. by injection-moulding, compression-moulding or extrusion, while the crystalline polyolefin is at a temperature above $T_m$.

By $t\frac{1}{2}$ we mean the time required for one-half of the free-radical generator to be dissociated.

In order that the cross-linking of the polyolefins may be effected at a reasonable rate $t\frac{1}{2}$ of the free-radical generator at temperatures below $T_m$ should not be excessively long. It is preferred that $t\frac{1}{2}$ at $T_m$ minus 10° C. should not be greater than 20 hours.

It will be appreciated that the process of our invention may be applied to any crystalline melt fabricatable polyolefin, for example polyethylene and polypropylene. It is particularly suitable for use with the highly crystalline polyethylenes, e.g. those obtained by polymerisations initiated by anionic co-ordination (or Ziegler) catalysts, and known as high density polyethylenes. However, the invention may also be applied to crystalline polyethylenes made by the peroxide-activated polymerisations, and to copolymers of ethylene which retain their crystallinity.

The amount of free-radical generator used will depend largely upon the extent of cross-linking required in the shaped article and upon the extent of premature reaction which is likely to occur during the chosen melt-shaping process. Thus, for example, if $x$ parts of free-radical generator are required to achieve the desired cross-linking after shaping and $y$ parts are lost in premature reaction during the shaping process, the amount required is about $x+y$ parts.

For most cases from 0.1 to 5 parts per 100 parts of polymer will suffice. The amount of free radical generator that will be lost during the melt-shaping step may be calculated from knowledge of the conditions of temperature and time of the melt-shaping step, and of the half life of the generator at these temperatures.

Although the process of our invention may conveniently be applied to any crystalline polyolefin it will now be described with particular reference to polyethylene.

Suitable free-radical generators for use with polyethylene may be found amongst peroxides and particular examples are dicumyl peroxide, ditertiary butyl peroxide and tertiary butyl hydroperoxide. The free radical generator preferably has a t½ at $T_m$ plus 10° C. of from half an hour to two hours and at $T_m$ minus 10° C. of not more than 10 hours.

For example, for use with a high density polyethylene, having a $T_m$ of about 130° C., dicumyl peroxide is a particularly suitable free-radical generator. Its t½ (measured on a 5% solution of the peroxide in benzene) at 140° C. is 32 minutes and at 120° C. is 400 minutes.

Preferably a polymerisable non-conjugated polyene is also present in the composition since this aids the cross-linking step. By a polymerisable non-conjugated polyene, we mean a compound which contains at least two ethylenic bonds which are activatable by free radicals and are non-conjugated. Examples are found amongst poly-α-alkenyl esters of polycarboxylic acids, poly(α,β-ethylenically unsaturated acid esters) of polyols, α-alkenyl esters of α,β-ethylenically unsaturated carboxylic acids and poly-α-alkenyl derivatives of aromatic hydrocarbons. Examples of particular compounds are allyl esters of maleic, fumaric, itaconic, citraconic, acrylic and methacrylic acids; diacrylates and dimethacrylates of diols; diallyl esters of sebacic, maleic and phthalic acids; polyallyl cyanurates and divinyl benzenes.

The amount of non-conjugated polyene used in the compositions is preferably 2 to 6 parts per 100 parts of polyymer by weight but amounts down to 1 part or up to 20 parts per 100 of polymer may be used, if desired.

The ingredients may be mixed in any suitable manner. Conveniently, they may be tumble blended, e.g. in a ball-mill. The composiiton may then be subjected to the melt-shaping process wherein it is heated above $T_m$, shaped while above $T_m$ and then caused or allowed to cool below $T_m$ so as to retain the shape given to it. The conditions of the shaping process and the nature of the free-radical generator are chosen such that no more than 60% of the generator is dissociated while the composition is above $T_m$. Preferably, the conditions are chosen such that as little of the free radical generator as possible is dissociated and it is usually desirable to control conditions such that less than 20% dissociation occurs, e.g. by effecting the shaping at as low a temperature as possible and by completing the shaping in as short a time as possible.

Ideally the shaping process is effected at a temperature of not more than about 20–25° C. above $T_m$ and under conditions such that the composition is at that temperature for not more than 5 minutes, longer times, e.g. up to 10 minutes, being acceptable at lower temperatures. If it is desired to reduce still further the effect of any dissociation of the free-radical generator during the shaping process, we have found it profitable to include a free-radical acceptor in the composition to be shaped, by which we mean a compound which competes with the polyolefin by reacting with the free-radicals produced by dissociation of the free-radical generator. Suitable examples include organic amines having hydrogen atoms which are labile to free-radicals, for example as in p-aminodiphenylamine.

The amount of free-radical acceptor required is preferably just that which minimises cross-linking during the melt-shaping step, and may be determined by simple experiment. The amount of cross-linking which occurs during the cross-linking step is proportional to the size of the low temperature peak on the curve obtained by plotting $\Delta T°$ versus T° C. for a sample of the melt-shaped article, using a Du Pont thermal analyser, and therefore may be determined with reference thereto.

The use of amounts much in excess of that just required to minimise the amount of cross-linking during the melt-shaping step may interfere with the post-shaping cross-linking step. Amounts of about 2 to 4 times the stoichiometric equivalent of the number of free-radicals released by the generator during the shaping step have been found generally adequate.

On completion of the shaping process, the composition is caused or allowed to cool below $T_m$. Thereafter, cross-linking may be effected by exposing the composition to a temperature above room temperature but below $T_m$ at which the free-radical generator's half life is such that the cross-linking may be effected within a reasonable time. The rate of reaction depends on the temperature of the heat treatment and therefore it is preferred to operate as near $T_m$ as possible but allowing at most only limited crystalline melting to occur. Temperatures of from $T_m$ minus 5° C. to $T_m$ minus 20° C. are generally satisfactory.

The time required for the cross-linking will vary according to the temperature of the heat treatment and the amount of cross-linking desired and/or the dissociation characteristics of the free-radical generator.

The cross-linking process is conveniently effected at normal pressure or at the moderately elevated pressures which may be achieved, e.g. in a hydraulic press. However, if desired, the cross-linking process may be effected at pressures substantially above atmospheric pressure whereby a significant increase in the crystalline melting point of the polyolefin is achieved thereby allowing more freedom in the choice of operating conditions and, in particular, shorter cross-linking times. For example, it is known that the crystalline melting point of polyethylene increases by approximately 25° C. for every 1000 atmospheres of pressure applied.

The process of our invention may be used to prepare shaped articles by injection moulding and is particularly suitable for the production of pipes or tubes by extrusion.

It is particularly desirable for a cross-linked polyolefin, and in particular polyethylene, to have as high a shear modulus as possible at temperatures just below $T_m$ if it is intended for use in hot environments, e.g. as in hot water pipe and hot water pipe fittings. By the use of our process, shear moduli as high as five times those of polymer compositions cross-linked at temperatures above $T_m$ in accordance with prior art methods have been obtained.

It will be appreciated that in such applications as hot water pipe the properties of our cross-linked polyethylenes may be improved by long term ageing since further cross-linking may be induced by the extended heat treatment obtained by contact with hot water. It will be further appreciated for the same reason that where the shaped article is intended for use in a hot environment, only a short heat treatment may be required before it is put into service, the remaining heat treatment being effected by the prolonged exposure to hot environments during service.

The invention is now illustrated by the following examples in which all parts are expressed as parts by weight.

EXAMPLE 1

100 parts of a high density polyethylene having a density of 0.965 g./cc. and a $T_m$ of 130° C. were ball-milled with 4 parts of dicumyl peroxide for about 3 hours. Samples of the composition were then compression moulded at 135° C. using a pressure of about 200 lbs./sq. in. and a time of 5 minutes to form 6 x 6 x 1/16 inch plaques and then allowed to cool below 130° C. Under these shaping conditions, it was calculated that about 6% by weight of the peroxide was dissociated.

One of the plaques was then heated in accordance with our invention to 120° C. for 45 minutes.

The shear moduli of 0.1 x 0.3 x 1.0 inch specimens cut from the treated plaque were then measured at various temperatures in the range of from 20 to 170° C. using a torsion pendulum and the technique described at page 141 of L. E. Nielsen's book "Mechanical Properties of Polymers," published by Reinhold. The results are shown in graphical form as curve A of the attached figure.

Another of the plaques was heated to 120° C. for 18 hours. The graph of shear modulus versus temperature of the resultant product is shown as curve B of the attached figure.

By way of comparison, the graph of shear modulus versus temperature for the unmodified polyethylene is shown as curve X, and that of a typical cross-linked polyethylene/peroxide composition where curing has been effected above $T_m$ is shown as curve Y.

EXAMPLE 2

A composition was prepared as in Example 1 except that 8 parts of diallyl maleate were also included, and 6 x 6 x 1/16 inch plaques were compression moulded also under the same conditions as in Example 1.

One of the plaques was then heated to 120° C. for 45 minutes and another was heated to the same temperature for 18 hours. Graphs of shear moduli versus temperature were plotted for both cross-linked products and are shown as curves C and D, respectively, in the attached figure.

EXAMPLE 3

A series of compositions were obtained by ball-milling in each case a mixture of 100 parts of the high density polyethylene used in Example 1, 4 parts of dicumyl peroxide, 5 parts of diallyl maleate and varying amounts of p-aminodiphenylamine.

A sample of each composition was then converted to a 6 x 6 x 1/16 inch plaque by compression moulding at 135° C. and a pressure of 200 lbs. sq. in. for 5 minutes. The plaques were then cooled below 130° C. and then held at 120° C. for 18 hours.

A graph of $\Delta T°$ versus $T°$ C. was then plotted for a specimen from each plaque using a DuPont Thermal Analyser and a heating rate of 20° C./minute. The effect of adding the p-aminodiphenylamine was then observed by examination of the size of the low temperature peak on the curve. The size of this low temperature peak is a measure of the extent to which cross-linking has occurred during the melt-shaping process. Where no amine had been used, a fairly large peak occurred. This was substantially reduced by the addition of 0.25 part of the amine, reduced still further when the amine concentration was raised to 0.5 part, and nearly disappeared at an amine concentration of 0.75 part.

EXAMPLE 4

100 parts of a high density polyethylene, Rigidex 85 (Rigidex is a registered trademark of B.P. Chemicals Ltd.), having a density of 0.949 gm./cc. and a $T_m$ of 121° C. were ball-milled with 10 parts of di-tertiary butyl peroxide for 3 hours. Samples of the composition were then compression moulded at 145° C. for 3 minutes under a pressure of 2 tons followed by 5 minutes under a pressure of 20 tons to form 6 x 6 x 1/8 inch plaques.

One of the plaques was allowed to cool under the applied pressure of 20 tons and was then removed from the press and heated in an oven at 117° C. for 90 hours. $T_m$ of the resultant product was 125° C. The sample was shown to contain 60% of insoluble gel by refluxing a weighed sample of approximately 2 gm. weight in 250 ml. of xylene for 17 hours, removing the sample from the xylene and drying to constant weight in a vacuum oven at 60° C. The percentage of insoluble gel is given by the expression $$\frac{\text{weight of dry sample after extraction by xylene}}{\text{(weight of original sample)}} \times 100\%$$

By way of comparison another of the plaques, after compression moulding at 145° C. for 8 minutes, was heated in the press for a further 20 minutes at 170° C. under the applied pressure of 20 tons and then allowed to cool under pressure. $T_m$ of the resultant product was 98 to 99° C.

EXAMPLE 5

100 parts of the high density polyethylene used in Example 4 were ball-milled for 3 hours with 10 parts of a low density polyethylene, having a density of 0.918 gm./cc. and a melt flow index of 2, and 3 parts of di-tertiary butyl peroxide.

The composition was extruded in a 1.25 inch Iddon extruder through a pipe die and a sizing sleeve against which the extruded pipe was expanded by an air pressure of approximately 12 lbs./sq. in. The pipe was extruded at a rate of 5 ft./min. and had an internal diameter of 3/8 inch and an external diameter of 1/2 inch. The temperature profile along the barrel of the extruder varied from 100° C. at the feed pocket to 133° C. at the die. The residence time in the extruder did not exceed 3 minutes.

A sample of the extruded pipe was heated in an oven at 117° C. for 136 hours. $T_m$ of the resultant product was 131° C. and by extraction in xylene was shown to contain insoluble gel.

By way of comparison another sample of the extruded pipe was heated in an oven at 170° C. for 20 minutes. The pipe distorted but did not flow completely and the resultant product had a $T_m$ of 107.5° C.

EXAMPLE 6

100 parts of the high density polyethylene used in Example 4 were ball-milled for 3 hours with 1.62 parts of di-tertiary butyl peroxide.

The composition was injection moulded in a Stübbe 2 oz. injection moulder having a barrel temperature of 130 to 135° C. into a mould at a temperature of 60° C. The residence time in the barrel was approximately 5 minutes and the moulding cycle varied from 30 to 45 seconds.

A sample of the injection moulded composition was heated in an oven at 117° C. for 136 hours. $T_m$ of the resultant product was 128° C., and was shown by extraction in xylene to contain insoluble gel.

By way of comparison another sample of the injection moulded composition was heated in an oven at 170° C. for 20 minutes. The resultant product had a $T_m$ of 108° C.

What we claim is:

1. In a process for the preparation of a shaped article of cross-linked polymer the improvement which comprises melt-shaping a composition comprising,
   (i) 100 parts by weight of crystalline polyolefin having a crystalline melting point $T_m$, and
   (ii) from 0.25 to 10 parts by weight of a thermally activatable free-radical generator having a half-life ($t\frac{1}{2}$) of longer than 20 minutes at $T_m$ plus 10° C., under conditions at which not more than 60% of the free-radical generator is dissociated while the composition is at a temperature above $T_m$, and thereafter causing or allowing the shaped composition to cool below $T_m$ and exposing it to a temperature which is above room temperature but below $T_m$ and at which thermal dissociation of the free-radical generator will occur, thereby effecting cross-linking.

2. A process as claimed in claim 1 in which the composition additionally contains from 1 to 20 parts by weight of a polymerisable non-conjugated polyene.

3. A process as claimed in claim 1 in which $t\frac{1}{2}$ of the free-radical generator at $T_m$ minus 10° C. is not greater than 20 hours.

4. A process as claimed in claim 1 in which the polyolefin is polyethylene.

5. A process as claimed in claim 4 in which the free-radical generator is selected from the group consisting of dicumyl peroxide and di-tertiary butyl peroxide.

6. A process as claimed in claim 1 in which $t\frac{1}{2}$ of the free-radical generator at $T_m$ plus 10° C. is from half an hour to 2 hours and $t\frac{1}{2}$ at $T_m$ minus 10° C. is not more than 10 hours.

7. A process as claimed in claim 1 in which the composition comprises from 1 to 5 parts by weight of free-radical generator per 100 parts by weight of crystalline polyolefin.

8. A process as claimed in claim 1 in which not more than 20% of the free-radical generator is dissociated while the composition is at a temperature above $T_m$.

9. A process as claimed in claim 2 in which the composition comprises from 2 to 6 parts by weight of non-conjugated polyene per 100 parts by weight of crystalline polyolefin.

10. A process as claimed in claim 9 in which the non-conjugated polyene is diallyl maleate.

11. A process as claimed in claim 1 in which the composition is melt-shaped by injection moulding.

12. A process as claimed in claim 1 in which the composition is melt-shaped by extrusion.

13. A shaped article of a cross-linked polymer prepared by a process as claimed in claim 1.

14. A shaped article as claimed in claim 13 which is a pipe or tube.

15. In a process for the preparation of a shaped article of cross-linked polymer the improvement which comprises melt-shaping a composition comprising,
  (i) 100 parts by weight of crystalline polyolefin having a crystalline melting point $T_m$, and
  (ii) from 0.25 to 10 parts by weight of a thermally activatable free-radical generator having a half-life ($t\frac{1}{2}$) of longer than 20 minutes at $T_m$ plus 10° C., under conditions at which not more than 60% of the free-radical generator is dissociated while the composition is at a temperature above $T_m$, the shaping temperature being greater than $T_m$ but not more than 20–25° C. above $T_m$ and thereafter causing or allowing the shaped composition to cool below $T_m$ and exposing it to a temperature which is above room temperature but below $T_m$ and at which thermal dissociation of the free-radical generator will occur, thereby effecting cross-linking.

References Cited

UNITED STATES PATENTS

| 2,858,281 | 10/1058 | Bauman et al. | 260—2.2 |
| 3,140,279 | 7/1964 | Gregorian et al. | 260—94.9 |
| 3,344,126 | 9/1967 | Witman | 260—79.5 |
| 3,436,371 | 4/1969 | Ware | 260—46.5 |

JOSEPH L. SCHOFER, Primary Examiner

J. KIGHT, Assistant Examiner

U.S. Cl. X.R.

260—78.5, 88.7, 93.7, 94.9; 264—184